United States Patent Office 3,642,842
Patented Feb. 15, 1972

3,642,842
SEMICARBAZONES AND THIOSEMICARBAZONES OF 17α-SUBSTITUTED 3-KETO-STEROIDS
Albert J. Begany, Perkiomenville, Kurt W. Ledig, Philadelphia, Donald W. Oliver, West Chester, and Gerhard R. Wendt, Havertown, Pa., assignors to American Home Products Corporation, New York, N.Y.
No Drawing. Filed Dec. 23, 1968, Ser. No. 786,373
Int. Cl. C07c 169/20
U.S. Cl. 260—397.5    11 Claims

ABSTRACT OF THE DISCLOSURE 13-alkyl-17α-substituted - 17 - hydroxygon-4-en-3-one, semicarbazones and thiosemicarbazones, $\Delta^{4,6,8(14),9 \text{ and } 11}$ dehydro analogs, and D-homo analogs thereof, optionally substituted by methyl at positions 1, 2, 4, 6, 7 and 11, alkanoyl at position 17, by alkyl, aryl, arylalkyl and alkylaryl in the semicarbazone or thiosemicarbazone group, and by a 17α-alkyl group or by methyl or halogen in a 17α-ethynyl group (I) are provided by condensing the corresponding 3-ketosteroid (II) with the corresponding semicarbazide or thiosemicarbazide (III). Compounds (I) are pharmacologically active in warm blooded lower animals as bronchodilators and as anti-inflammatory agents.

---

This invention relates to novel steroidal compounds with valuable pharmacological properties. More particularly, it is concerned with semicarbazones and thiosemicarbazones of 17α - substituted-3-ketosteroids which exhibit bronchodilating and anti-inflammatory activity in standard pharmacological tests when administered to warm blooded laboratory animals.

DESCRIPTION OF THE INVENTION

The compounds contemplated by this invention are those of Formula I:

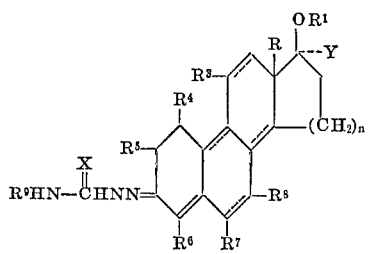

wherein X is O or S; Y is alkyl or —C≡CR² wherein R² is hydrogen, methyl, chloro, bromo or fluoro; R is alkyl; R¹ is hydrogen or alkanoyl; $R^3$, $R^4$, $R^5$, $R^6$, $R^7$ and $R^8$ are hydrogen or methyl; $R^9$ is hydrogen, alkyl, monocarbocyclic aryl, monocarbocyclic arylalkyl or alkyl-monocarbocyclic aryl; $n$ is 1 or 2; the broken lines indicate a single or double bond and said alkyl and alkanoyl substituents contain from about 1 to about 7 carbon atoms.

Special mention is made of a number of particularly important embodiments of this invention: These are the gon-4-ene compounds of Formula I wherein:

X is S; Y is —C≡CH, R is ethyl, $R^1$, $R^2$, $R^3$, $R^4$, $R^5$, $R^6$, $R^7$, $R^8$ and $R^9$ are hydrogen and $n$ is 1, i.e., 13-ethyl-17α - ethynyl - 17 - hydroxygon-4-en-3-one, thiosemicarbazone, and especially the l-enantiomer thereof, substantially free of the d-enantiomer;

X is S, Y is —C≡CH, R is methyl, $R^1$, $R^3$, $R^4$, $R^5$, $R^6$, $R^7$, $R^8$ and $R^9$ are hydrogen and $n$ is 1, i.e., 17α-ethynyl-17-hydroxyestr-4-en-3-one, thiosemicarbazone;

X is S; Y is —C≡CCl, R is ethyl, $R^1$, $R^3$, $R^4$, $R^5$, $R^6$, $R^7$, $R^8$ and $R^9$ are hydrogen and $n$ is 1, i.e., 17α-chloro-ethynyl - 13 - ethyl-17-hydroxygon-4-en-3-one, thiosemicarbazone;

X is S; Y is —C≡CCl, R and $R^9$ are ethyl, $R^1$, $R^3$, $R^4$, $R^5$, $R^6$, $R^7$ and $R^8$ are hydrogen and $n$ is 1, i.e., 17α-chloroethynyl - 13 - ethyl-17-hydroxygon-4-en-3-one, (4-ethyl-3-thiosemicarbazone);

X is S, Y is —C≡CH, R and $R^9$ are ethyl, $R^1$, $R^3$, $R^4$, $R^5$, $R^6$, $R^7$ and $R^8$ are hydrogen and $n$ is 1, i.e., 13-ethyl-17α-ethynyl-17-hydroxygon-4-en-3-one, (4 - ethyl-3-thiosemicarbazone);

X is S; Y and R are ethyl; $R^1$, $R^3$, $R^4$, $R^5$, $R^6$, $R^7$, $R^8$ and $R^9$ are hydrogen and $n$ is 1, i.e., 13,17α-diethyl-17-hydroxygon-4-en-3-one, thiosemicarbazone; and X is O; Y is —C≡CH, R is ethyl, $R^1$, $R^3$, $R^4$, $R^5$, $R^6$, $R^7$, $R^8$ and $R^9$ are hydrogen and $n$ is 1, i.e., 17-hydroxy-17α-ethynylestra-4-en-3-one, semicarbazone.

X is S; Y is —C≡CH; R is methyl; $R^1$, $R^3$, $R^4$, $R^5$, $R^6$, $R^7$ and $R^8$ are hydrogen; $R^9$ is ethyl and $n$ is 1, i.e., 17α-ethynyl-17-hydroxyestr-4-en-3-one, (4 - ethyl-3-thiosemicarbazone); and X is S; Y is —C≡CH; R is methyl, $R^1$, $R^3$, $R^4$, $R^5$, $R^6$, $R^7$ and $R^8$ are hydrogen; $R^9$ is methyl and $n$ is 1, i.e., 17α-ethynyl - 17 - hydroxyestr-4-en-3-one, (4-methyl-3-thiosemicarbazone).

With reference to Formula I and the definitions of substituents, a preferred family of analogs of the $\Delta^4$ compounds are the $\Delta^{4,9}$, the $\Delta^{4,9,11}$, the $\Delta^{4,6}$, the $\Delta^{4,8(14)}$ and the $\Delta^{4,6,8(14)}$ dehydro analogs thereof. The term "alkyl" contemplates hydrocarbon substituents of from about 1 to about 7 carbon atoms, straight chain and branched, illustrative members of which are methyl, ethyl, n-propyl, i-propyl, n-butyl, t-butyl, n-pentyl, 2-methyl-pentyl, n-hexyl, n-heptyl, and the like. The term "alkanoyl" contemplates hydrocarbon acyl radicals of from about 1 to about 7 carbon atoms, the hydrocarbon portion of which may be straight chain and branched, illustrative members of which are formyl, acetyl, n-propionyl, n-butyryl, i-butyryl, n-pentanoyl, n-hexanoyl, n-heptanoyl, and the like. When $n$ is 1 ring D of the normal series of steroids is contemplated, when $n$ is 2 there is contemplated the D-homo series. The terms "monocarbocyclic aryl" and "alkyl monocarbocyclic aryl" contemplates the phenyl ring and phenyl substituted with from about 1 to about 3 alkyl groups as above defined, particularly the tolyl and xylyl groups. "Monocarbocyclic arylalkyl" contemplates phenyl-substituted alkyl of from 1 to 7 carbon atoms, illustratively, benzyl, α-phenylethyl, and the like. In a preferred family of compounds of Formula I, R is $C_1$ to $C_4$ alkyl, $R^1$ is hydrogen or acetyl, $R^2$ is hydrogen or chloro, $R^3$, $R^4$, $R^5$, $R^6$, $R^7$ and $R^8$ are hydrogen, and $R^9$ is hydrogen or $C_1$–$C_4$ alkyl, preferably ethyl.

In the product (I) of a total synthesis which has not included a suitable resolution stage the compounds of the invention will be present as racemates. Using a convention approved by Fieser and Fieser, "Steroids," p. 336 (1959), the compounds designated as the d-forms are the enantiomers corresponding in configuration to that of the natural hormone estrone. The corresponding enantiomorphs are consequently designated the l-forms and the racemates the dl-forms. Racemates will be depicted by structural formulas which show only the enanthiomorphs of the d-configuration. A preferred family of compounds of Formula I comprises the l-enantiomers, substantially free of the d-enantiomers. Although all in common, the dl-, the d- and the l-forms, possess potent bronchodilating properties, the l-forms are surprisingly devoid of progestational activity. Because of this they are useful in instances wherein hormonal effects are not desired.

The compounds of Formula I hereinabove are prepared by a process comprsiing condensing a 3-keto steroid of Formula II:

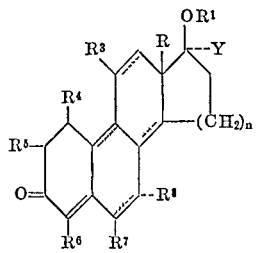

wherein R, R¹, R², R³, R⁴, R⁵, R⁶, R⁷, R⁸ and n are as hereinabove defined, with a semicarbazide of Formula III:

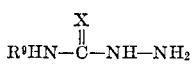

wherein X and R⁹ are as hereinabove defined until formation of a semicarbazone compound of Formula I is substantially complete and recovering said compound.

The conditions under which the said process is carried out are not particularly critical. The 3-ketosteroid (II) can be reacted with the stoichiometrical amount or an excess of the semicarbazide (III) in an inert diluent, e.g., a lower alkanol, e.g., methanol or ethanol (or acetic acid with thiosemicarbazide in some cases, see examples), or even in mixtures thereof at temperatures of from about 10° C. to about the reflux temperature of the mixture—steam bath temperatures are especially useful. Depending generally on the nature of the reactants and the temperature, the condensation is substantially complete in from about 10 minutes to about 24 hours. The products (I) can be recovered by any conventional means, such as by adding water, and separating and recrystallizing the liberated product, or by evaporating the solvent leaving the product as a residue. In one manner of proceeding, 0.5 part by weight of 3-ketosteroid (II) and 0.3 part by weight of semicarbazide (III) are suspended in 10 parts by volume of glacial acetic acid and the mixture is heated to reflux for 10 minutes. Cooling and diluting with water causes the product to separate. The product is filtered off and, if desired, purified by recrystallization, e.g., from alcohol and water. This general technique and modifications will be exemplified in detail hereinafter.

The starting materials of Formula II are 3-ketosteroids which can be obtained by means known to those skilled in the art. Reference is made, for example, to the description of the total synthesis of 17α-substituted gon-3-ones in H. Smith, G. A. Hughes, G. H. Douglas, G. R. Wendt, G. C. Buzby, Jr., R. A. Edgren, J. Fisher, T. Foell, B. Gadsby, D. Hartley, D, Herbst, A. B. A. Jansen, K. Ledig, B. J. McLoughlin, J. McMenamin, T. W. Pattison, P. C. Phillips, R. Rees, J. Siddal, J. Siuda, L. L. Smith, J. Tokolics and D. H. P. Watson, J. Chem. Soc., 1964, 4472–4492.

Illustrative of important starting materials of Formula II are:

d-17α-ethynyl-17-hydroxyestra-4,9-11-trien-3-one, acetate (Netherlands patent application No. 66. 10,741);

d-17α - chloroethynyl - 17 - hydroxyestra - 4,9,11-trien-3-one [Compt. Rend. 260, 4545 (1965)];

d-1α,7α - dimethyl-17α-ethynyl-17-hydroxyestr-4-en-3-one (ICF Vol. 10, Netherlands Week No. 145, Basic 18,863);

d-17α - ethynyl - 17 - hydroxy-4-methylestr-4-en-3-one (J. Chem. Soc. 1962, p. 1091);

dl-17α-ethynyl-17-hydroxyestra - 4,8(14)-dien-3-one [J. Org. Chem., 31, 3780 (1966)];

d-17α-ethynyl-17-hydroxyestra-4,9-dien-3-one [J. Am. Chem. Soc., 82, 2402 (1960)];

d - 17α - ethynyl - 17 - hydroxyestr - 4,9,11 - trien-3-one [Compt. Rend. 260, 4545 (1965)];

d-17α-ethynyl-17-hydroxy - 11β - methylestr-4-en-3-one (according to the procedures of U.S. 3,299,102); and, in addition, d-17α-ethynyl-17-hydroxyestr-4-en-3-one;

l-13-ethyl-17α-ethynyl-17-hydroxygon-4-en-3-one;

dl-17α-chloroethynyl-13-ethyl - 17 - hydroxygon-4-en-3-one;

dl-13-ethyl-17α-ethynyl-17-hydroxygon-4-en-3-one;

d-17α-chloroethynyl-17-hydroxyestra-4,9-dien-3-one;

dl-13-ethyl-17α - ethynyl-17-hydroxygon - 4 - en-3-one-acetate;

dl-13 - ethyl-17α-ethynyl-17-hydroxygon-4-en-3-one, n-heptanoate;

dl-17aα-chloroethynyl-13-ethyl - 17a - hydroxy - D - homogon-4-en-3-one;

dl-17β - hydroxy-13-n-propyl-17-(1-propynyl)gona-4,9-dien-3-one;

dl-13-ethyl - 17aα - ethynyl-17a-hydroxy-D-homogon-4-en-3-one;

dl-13-ethyl-17α-ethynyl-17-hydroxygona-4,8(14) - dien-3-one;

dl-13-ethyl-17α-ethynyl-17-hydroxy - 6α - methylgon-4-en-3-one;

dl-13 - ethyl-17α-ethynyl-17-hydroxygon-4,6-dien-3-one, acetate;

l-17α-chloroethynyl-13-ethyl - 17 - hydroxygon-4-en-3-one;

dl-17α-ethynyl-17-hydroxyester-4-en-3-one, acetate;

dl-17α-ethynyl-17-hydroxy-13-n-propylgona - 4,9 - dien-3-one; and dl-13-n-butyl-17α-ethynyl-17-hydroxygon-4-en-3-one.

The semicarbazides of Formula III are items of commerce or can be prepared in known ways.

Illustrative of the important starting materials of Formula III are: thiosemicarbazide; 4-methylthiosemicarbazide; 4-ethylthiosemicarbazide; and 4-butylthiosemicarbazide, all of which are commercially available; and 4-heptylthiosemicarbazide; 4-phenylthiosemicarbazide; 4-benzylthiosemicarbazide; and 4α-phenylethylthiosemicarbazide, which can be prepared according to J. Chem. Soc., 1927, p. 2529; and 4-o-tolylthiosemicarbazide and 4 - p - tolylthiosemicarbazide, both of which can be prepared according to Ann., 434, 289 (1923). The corresponding semicarbazides are likewise commercially available or easily prepared.

As is mentioned hereinabove, the instant compounds of Formula I in standard pharmacological tests have bronchodilating and anti-inflammatory activity. More particularly, when administered intraperitoneally to guinea pigs, compounds of Formula I are found to protect the animals against respiratory difficulties (bronchoconstriction) induced by a histamine mist. When administered perorally to rats, compounds of Formula I are found to inhibit experimentally induced inflammatory swellings, specifically the edema induced in the rat's right hind paw by injection of a 1% carrageenin solution in saline into the tissue thereof. The instant compounds, therefore, are deemed to possess utility in experimental and comparative pharmacology and are of value to treat conditions in animals, such as valuable domestic animals, and in laboratory animals, such as mice, rats, guinea pigs and the like, responsive to treatment with bronchodilators, such as the need to relieve bronchial spasm, and with anti-inflammatory agents, such as the need to prevent edemae.

When used for these pharmacologically important purposes, the compounds of Formula I of this invention may be administered either alone or in combination with other pharmacologically-active ingredients. Whether singly or in combination, they may be used in the form of solid compositions for oral administration combined, if desired, with extenders or carriers that are relatively non-toxic or inert. They may be put into tablet, capsule or powder form.

They may be mixed with animal foodstuffs. On the other hand, they may be administered in liquid form as a suspension or solution in a vehicle for parenteral use. By way of illustration pharmacological action as bronchodilators in guinea pigs has been demonstrated when compounds of this invention have been administered at dosages of 25 and 30 mg./kg., i.p.; and as anti-inflammatory agents in rats at a dosage of 50 mg./kg., p.o.

DESCRIPTION OF THE PREFERRED EMBODIMENTS

The following examples are given by way of illustration and are not to be construed as limitations of this invention, many variations of which are possible without departing from the scope and spirit thereof.

EXAMPLE 1 d-17α-ethynyl-17-hydroxyestr-4-en-3-one, thiosemicarbazone

A solution of 894 mg. of d-17α-ethynyl-17-hydroxyestr-4-en-3-one, 273 mg. of thiosemicarbazide, and 50 ml. of alcohol is heated on a steam bath for 3 hours while evaporating 25 ml. of the solvent. After the addition of 10 ml. of acetic acid, the reaction mixture is refluxed another hour, diluted with water, and the precipitate filtered to give 900 mg. of the title compound; M.P. 150–160° C.

Analysis.—Found (percent): C, 67.89; H, 7.85; N, 10.75; S, 8.54. $C_{21}H_{29}N_3OS$ requires (percent): C, 67.88; H, 7.86; N, 11.30; S, 8.63.

EXAMPLE 2 l-13-ethyl-17α-ethynyl-17-hydroxygon-4-en-3-one thiosemicarbazone

A suspension of 180 mg. of thiosemicarbazide, 620 mg. of l-13-ethyl-17α-ethynyl-17-hydroxygon-4-en-3-one, 10 ml. of alcohol and 10 ml. of acetic acid is heated on the steam bath for 1 hour. On addition of water, a gum is obtained which is crystallized from alcohol and water to give 500 mg. of the title compound; M.P. 160–170° C.

Analysis.—Found (percent): C, 68.50; H, 8.13; N, 10.87; S, 8.28. $C_{22}H_{31}N_3OS$ requires (percent): C, 68.54; H, 8.11; N, 10.90; S, 8.3.

EXAMPLE 3 dl-17α-chloroethynyl-13-ethyl-17-hydroxygon-4-en-3-one, thiosemicarbazone

A solution of 0.5 g. of dl-17α-chloroethynyl-13-ethyl-17-hydroxygon-4-en-3-one and 0.3 g. of thiosemicarbazide in 10 ml. of glacial acetic acid is heated to reflux for 10 minutes. A precipitate forms on cooling and dilution with water. The product is filtered, leached once with hot water, filtered again and dried to obtain 0.3 g. of the title compound, M.P. 155° C. dec.

$\lambda_{max.}^{KBr}$ 3.10, 3.47, 4.57, 6.35, 6.75μ

Analysis.—Found (percent): C, 63.10; H, 7.25; N, 10.36; Cl, 8.40; S, 7.14. $C_{22}H_{30}ON_3SCl$ requires (percent): C, 62.91; H, 7.12; N, 10.00; Cl, 8.44; S, 7.64.

EXAMPLE 4 dl-17α-chloroethynyl-13-ethyl-17-hydroxygon-4-en-3-one, (4-ethyl-3thiosemicarbazone)

A solution of 0.5 g. of dl-17α-chloroethynyl-13-ethyl-17-hydroxygon-4-en-3-one and 0.2 g. of 4-ethyl-3-thiosemicarbazide in 10 ml. of glacial acetic acid is heated to reflux for 10 minutes. A precipitate forms on cooling and dilution with water. The product is filtered, dissolved in methanol, filtered again and reprecipitated by adding water. Filtration of the product affords 0.4 g. of the title compound, M.P. 17° C. dec.

$\lambda_{max.}^{KBr}$ 3.00, 3.44, 6.15, 6.52

Analysis.—Found (percent): C, 64.15; H, 7.66; N, 9.39; S, 7.27; Cl, 7.98. $C_{24}H_{34}ON_3SCl$ requires (percent): C, 64.33; H, 7.65; N, 9.38; S, 7.16; Cl, 7.91.

EXAMPLE 5 dl-13-ethyl-17α-ethynyl-17-hydroxygon-4-ene-3-one, (4-ethyl-3-thiosemicarbazone)

A solution of 1.0 g. of dl-13-ethyl-17α-ethynyl-17-hydroxygon-4-en-3-one and 0.45 g. of 4-ethyl-3-thiosemicarbazide is dissolved in 25 ml. of glacial acetic acid. The solution is refluxed for 10 minutes. On cooling, a precipitate forms which was filtered and washed with water. The product is dried at 80° C. over $P_2O_5$ and KOH to obtain 0.95 g. of the title compound, M.P. 230–232° C., $\lambda_{max.}^{KBr}$ 2.96, 3.12, 3.50, 6.18, 6.59, 6.72

Analysis.—Found (percent): C, 70.13; H, 8.45; N, 9.85; S, 7.88. $C_{24}H_{35}ON_3S$ requires (percent): C, 69.70; H, 8.53; N, 10.16; S, 7.74.

EXAMPLE 6 dl-13-ethyl-17α-ethynyl-17-hydroxygon-4-en-3-one, thiosemicarbazone

To a solution of 180 mg. of thiosemicarbazide in 35 ml. alcohol is added 620 mg. of dl-13-ethyl-17α-ethynyl-17-hydroxygon-4-en-3-one. After the reaction mixture has been refluxed for 12 hours, 5 ml. of the solvent is evaporated to give on cooling 700 mg. of the title compound; M.P. 160–163° C.

Analysis.—Found (percent): C, 68,43; H, 7.81; S, 7.97. $C_{22}H_{31}N_3OS$ requires (percent): C, 68.54; H, 8.11; S, 8.3.

EXAMPLE 7 dl-13-ethyl-17α-ethynyl-17-hydroxygon-4-en-3-one (4-methyl-3-thiosemicarbazone)

The procedure of Example 5 is repeated, substituting 4-methylthiosemicarbazide for 4-ethylthiosemicarbazide and the product is obtained.

EXAMPLE 8 dl-13-ethyl-17α-ethynyl-17α-hydroxygon-4-en-3-one, (4-butyl-3-thiosemicarbazone)

The procedure of Example 5 is repeated, substituting 4-butylthiosemicarbazide for 4-ethylthiosemicarbazide and the product is obtained.

EXAMPLE 9 dl-13-ethyl-17α-ethynyl-17-hydroxygon-4-en-3-one, (4-heptyl-3-thiosemicarbazone)

The procedure of Example 5 is repeated, substituting 4-heptylthiosemicarbazide for 4-ethylthiosemicarbazide and the product is obtained.

EXAMPLE 10 dl-13-ethyl-17α-ethynyl-17-hydroxygon-4-en-3-one, (4-phenyl-3-thiosemicarbazone)

The procedure of Example 5 is repeated substituting 4-phenylthiosemicarbazide for 4-ethylthiosemicarbazide and the product is obtained.

EXAMPLE 11 dl-13-ethyl-17α-ethynyl-17-hydroxygon-4-en-3-one, (4-benzyl-3-thiosemicarbazone)

The procedure of Example 5 is repeated substituting 4-benzylthiosemicarbazide for 4-ethylthiosemicarbazide and the product is obtained.

EXAMPLE 12 dl-13-ethyl-17α-ethynyl - 17 - hydroxygon-4-en-3-one, (4α-phenylethyl-3-thiosemicarbazone)

The procedure of Example 5 is repeated substituting 4α-phenylethylthiosemicarbazide for 4-ethylthiosemicarbazide and the product is obtained.

EXAMPLE 13 dl-13 - ethyl-17α-ethynyl-17-hydroxygon-4-en-3-one, (4-o-tolyl-3-thiosemicarbazone)

The procedure of Example 5 is repeated substituting 4-o-tolylthiosemicarbazide for 4 - ethylthiosemicarbazide and the product is obtained.

EXAMPLE 14 dl-13-ethyl-17α-ethynyl-17-hydroxygon-4-en-3-one, (4-p-tolyl-3-thiosemicarbazone)

The procedure of Example 5 is repeated substituting 4-p-tolylthiosemicarbazide for 4-ethylthiosemicarbazide and the product is obtained.

EXAMPLE 15

The procedure of Example 6 is repeated substituting for the dl-13-ethyl-17α-ethynyl - 17 - hydroxygon-4-en-3-one, stoichiometrical amounts of the following 3-ketosteroids:

d-17α-ethynyl-17-hydroxyestra-4,9,11-trien-3-one, acetate;
d-17α-chloroethynyl-17-hydroxyestra-4,9,11-trien-3-one;
d-1α,7α-dimethyl-17α-ethynyl - 17 - hydroxyestr-4-en-3-one;
d-17α-ethynyl-17-hydroxy-4-methylestr-4-en-3-one;
dl-17α-ethynyl-17-hydroxyestra-4,8(14)-dien-3-one;
d-17α-ethynyl-17-hydroxyestra-4,9-dien-3-one;
d-17α-ethynyl-17-hydroxyestr-4,9,11-trien-3-one;
d-17α-ethynyl-17-hydroxy-11β-methylestr-4-en-3-one;
d-17α-chloroethynyl-17-hydroxyestra-4,9-dien-3-one;
dl-13-ethyl - 17α - ethynyl - 17 - hydroxygon-4-en-3-one-acetate;
dl-13-ethyl - 17α - ethynyl - 17 - hydroxygon-4-en-3-one, n-heptanoate;
dl-17αα - chloroethynyl-13-ethyl-17α-hydroxy-D-homogon-4-en-3-one;
dl-17β - hydroxy-13-n-propyl-17-(1-propynyl)gona-4,9-dien-3-one;
dl-13-ethyl-17aα-ethynyl - 17a - hydroxy-D-homogon-4-en-3-one;
dl - 13-ethyl-17α-ethynyl-17-hydroxygona-4,8(14)-dien-3-one;
dl-13-ethyl-17α-ethynyl - 17 - hydroxy-6α-methylgon-4-en-3-one;
dl - 13-ethyl-17α-ethynyl-17-hydroxygon-4,6-dien-3-one, acetate;
l-17α-chloroethynyl - 13 - ethyl-17-hydroxygon-4-en-3-one;
dl-17α-ethynyl-17-hydroxyestr-4-en-3-one, acetate;
dl-17α-ethynyl - 17 - hydroxy-13-n-propylgona-4,9-dien-3-one; and
dl-13-n-butyl-17α-ethynyl-17-hydroxygon-4-en-3-one.

The following compounds are obtained:

d - 17α-ethynyl-17-hydroxyestra-4,9,11-trien-3-one, acetate, thiosemicarbazone;
d-17α-chloroethynyl - 17 - hydroxyestra-4,9,11-trien-3-one, thiosemicarbazone;
d-1α,7α-dimethyl-17α-ethynyl - 17 - hydroxyestr-4-en-3-one, thiosemicarbazone;
d-17α-ethynyl - 17 - hydroxy-4-methylestr-4-en-3-one, thiosemicarbazone;
dl-17α-ethyl - 17-hydroxyestra-4,8(14)-dien-3-one, thiosemicarbazone;
d-17α-ethynyl - 17 - hydroxyestra - 4,9-dien-3-one, thiosemicarbazone;
d-17α - ethynyl-17-hydroxyestr-4,9,11-trien-3-one, thiosemicarbazone;
d-17α-ethynyl - 17 - hydroxy-11β-methylestr-4-en-3-one, thiosemicarbazone;
d-17α-chloroethynyl - 17 - hydroxyestra-4,9-dien-3-one, thiosemicarbazone;
dl-13-ethyl - 17α - ethynyl - 17 - hydroxygon-4-en-3-one acetate, thiosemicarbazone;
dl-13-ethyl - 17α - ethynyl-17-hydroxygon-4-en-3-one, n-heptanoate, thiosemicarbazone;
dl-17αα-chloroethynyl - 13 - ethyl-17a-hydroxy-D-homogon-4-en-3-one, thiosemicarbazone;
dl-17β-hydroxy - 13 - n - propyl-17-(1-propynyl)gona-4,9-dien-3-one, thiosemicarbazone;
dl-13-ethyl-17aα-ethynyl - 17a - hydroxy-D-homogon-4-en-3-one, thiosemicarbazone;
dl-13-ethyl-17α-ethynyl - 17 - hydroxygona-4,8(14)-dien-3-one, thiosemicarbazone;
dl-13-ethyl - 17α - ethynyl - 17 - hydroxy-6α-methylgon-4-en-3-one, thiosemicarbazone;
dl-13-ethyl - 17α - ethynyl - 17 - hydroxygon-4,6-dien-3-one, acetate, thiosemicarbazone;
l-17α-chloroethynyl - 13 - ethyl-17-hydroxygon-4-en-3-one thiosemicarbazone;
dl-17α-ethynyl - 17 - hydroxyestr-4-en-3-one, acetate, thiosemicarbazone;
dl-17α-ethynyl - 17 - hydroxy-13-n-propylgona-4,9-dien-3-one, thiosemicarbazone; and
dl-13-n-butyl - 17α - ethynyl - 17 - hydroxygon-4-en-3-one, thiosemicarbazone.

EXAMPLE 16 dl-13,17α-diethyl-17-hydroxygon-4-en-3-one, thiosemicarbazone

A solution of 1.26 g. of dl-13,17α-diethyl-17-hydroxygon-4-en-3-one, 0.364 g. of thiosemicarbazide, 125 ml. of alcohol, 10 ml. of acetic acid is refluxed for two hours. The reaction mixture is diluted with 300 ml. of water and the resulting precipitate is collected to give 1.1 g. of the title compound; M.P. 163–164° C.

*Analysis.*—Found (percent): C, 67.29; H, 8.84; N, 10.53; S, 8.55. $C_{22}H_{35}N_3OS$ requires (percent): C, 67.82; H, 9.06; N, 10.73; S, 8.23.

EXAMPLE 17 d-17-hydroxy-17α-ethynylestra-4-en-3-one, semicarbazone

A suspension of 1.0 g. of d-17-hydroxy-17α-ethynyl-estr-4-en-3-one, 1.0 g. of sodium acetate (anhydrous), 1.0 g. of semicarbazide hydrochloride, 12.5 ml. of alcohol, and 15 ml. of water is refluxed for 4 hours. The reaction mixture is diluted with water and the resulting precipitate is filtered to give 0.7 g. of the title compound; M.P. 180–200° C. dec.

*Analysis.*—Found (percent): C, 70.78; H, 8.09; N, 11.53. $C_{21}H_{29}N_3O_2$ requires (percent): C, 70.95; H, 8.22; N, 11.82.

EXAMPLE 18

The procedure of Example 17 is repeated substituting for the d-17-hydroxy-17α-ethynylestr-4-en-3-one, stoichiometrical amounts of the 3-ketosteroids used as starting materials in Example 15. The following compounds are obtained:

d-17α-ethynyl-17-hydroxyestra-4,9,11-trien-3 - one, acetate, semicarbazone;
d-17α-chloroethynyl-17-hydroxyestra-4,9,11 - trien - 3-one, semicarbazone;
d-1α,7α-dimethyl-17α-ethynyl-17-hydroxyestr-4 - en - 3-one, semicarbazone;
d-17α-ethynyl-17-hydroxy-4-methylestr-4 - en - 3 - one, semicarbazone;
dl-17α-ethyl-17-hydroxyestra-4,8(14)-dien-3-one, semicarbazone;
d-17α-ethynyl-17-hydroxyestra-4,9-dien - 3 - one, semicarbazone;
d-17α-ethynyl-17-hydroxyester-4,9,11-trien-3-one, semicarbazone;
d-17α-ethynyl-17-hydroxy-11β-methylestr-4-en-3 - one, semicarbazone;
d-17α-chloroethynyl-17-hydroxyestra-4,9-dien - 3 - one, semicarbazone;

dl-13-ethyl-17α-ethynyl-17-hydroxygon-4-en-3-one-acetate, semicarbazone;

dl-13-ethyl-17α-ethynyl-17-hydroxygon-4-en-3-one, n-heptanoate, semicarbazone;

dl-17aα-chloroethynyl-13-ethyl-17a-hydroxy-D-homogon-4-en-3-one, semicarbazone;

dl-17β-hydroxy-13-n-propyl-17-(1-propynyl)gona-4,9-dien-3-one, semicarbazone;

dl-13-ethyl-17aα-ethynyl-17a-hydroxy-D-homogon-4-en-3-one, semicarbazone;

dl-13-ethyl-17α-ethynyl-17-hydroxygona-4,8(14)-dien-3-one, semicarbazone;

dl-13-ethyl-17α-ethynyl-17-hydroxy-6α-methylgon-4-en-3-one, semicarbazone;

dl-13-ethyl-17α-ethynyl-17-hydroxygon-4,6-dien-3-one, acetate, semicarbazone;

l-17α-chloroethynyl-13-ethyl-17-hydroxygon-4-en-3-one, semicarbazone;

dl-17α-ethynyl-17-hydroxyestr-4-en-3-one, acetate, semicarbazone;

dl-17α-ethynyl-17-hydroxy-3-n-propylgona-4,9-dien-3-one, semicarbazone; and dl-13-n-butyl-17α-ethynyl-17-hydroxygon-4-en-3-one, semicarbazone.

EXAMPLE 19 d-17α-ethynyl-17-hydroxyestr-4-en-3-one, (4-ethyl-3-thiosemicarbazone)

A solution of 1 g. of d-17α-ethynyl-17-hydroxyestr-4-en-3-one and 0.41 g. of 4-ethyl-3-thiosemicarbazide in 25 ml. of glacial acetic acid is heated to reflux for 10 minutes. After cooling, the solution is diluted with water, and the resulting precipitate is filtered off and washed with water. The solid material is crystallized from 60 ml. of methanol to obtain 0.78 g. of flakes identified to be the title compound, M.P. 229–232° C., dec., $\lambda_{max}^{KBr}$. 3.15, 3.50, 6.18, 6.60μ

*Analysis.*—Found (percent): C, 69.03; H, 8.34; N, 10.54; S, 8.23. $C_{23}H_{33}ON_3S$ requires (percent): C, 69.13; H, 8.32; N, 10.52; S, 8.02.

EXAMPLE 20 d-17α-ethynyl-17-hydroxyestr-4-en-3-one, (4-methyl-3-thiosemicarbazone)

A solution of 1 g. of d-17α-ethynyl-17-hydroxyestr-4-en-3-one and 0.36 g. of 4-methylthiosemicarbazide in 25 ml. of glacial acetic acid is heated to reflux for 10 minutes. After cooling, the solution is diluted with water, and the resulting precipitate is filtered off, and washed with water. The solid material is crystallized from 60 ml. of methanol to obtain 0.65 g. of flakes identified to be the title compound, M.P. 239–242° C., dec., $\lambda_{max}^{KBr}$. 3.15, 3.50, 6.17, 6.55, 6.70μ

*Analysis.*—Found (percent): C, 68.41; H, 7.75; S, 8.81; N, 10.77. $C_{22}H_{31}OSN_3$ requires (percent): C, 68.53; H, 8.10; S, 8.32; N, 10.90.

In evaluating the instant compounds for pharmacological activity, they are tested in vivo by standard methods with the following results.

Anti-inflammatory screening and evaluation.—Anti-inflammatory activity of a compound is assessed by its ability to inhibit experimentally-induced edema in the hind paw of the rat [Winter et al., Proc. Soc. Exp. Biol. and Mid., 111, 544 (1962) and Buttle et al., Nature, 179, 629 (1957)]. Male Sprague-Dawley rats 120–165 grams are used. Compound is administered perorally as a solution or suspension in distilled water (plus 2 drops of polyoxyethylene sorbitan monooleate) in a volume of 10 ml./kg. Each compound is given to 6 rats and vehicle alone is administered to 6 more rats as a control. One hour after drug administration edema is induced by an injection of 0.05 ml. of a 1% carrageenin solution in saline into the subplantar tissue of the rat's right hind paw. Paw volume is then immediately measured volumetrically with a plethysmograph and again 3 hours later. The mean volume of swelling for the control group is calculated and compared to the test groups. Compounds that inhibit swelling approximately 26% as compared to controls are considered active.

In this test, 12-ethyl-17α-ethynyl-17-hydroxygon-4-en-3-one, thiosemicarbazone administered p.o. at 50 mg./kg., induced a 28 percent inhibition and was active.

Bronchodilator screening and evaluation.—The bronchodilator activity of a compound is determined by its ability to protect a guinea pig against the bronchoconstrictor effects of a histamine mist [Modification of Seigmund et al., J. Pharmacol., 90, 254 (1947); 97, 14 (1949)]. A 0.2% (base) histamine diphosphate solution is atomized and sprayed into a closed chamber for 60 seconds. The guinea pig is then placed into the chamber and observed for asphyxial effects. When convulsions are imminent, the pig is removed from the chamber and allowed to recover. The time from placing the pig in the chamber until convulsions are imminent is recorded and is designated pre-convulsion time. Five pigs are used per compound and control times are obtained for each pig in the morning. Only pigs having control times in the range of 50–100 seconds are used in the test. After a 3½ to 4 hour recovery period the pigs are administered compound intraperitoneally and 15 minutes later are again exposed to the histamine aerosol. An animal that can withstand 3 times its morning preconvulsion time is considered completely protected. Individual control (C) and post drug preconvulsion times (T) are recorded and an activity value calculated by the formula, (T/C). A mean (T/C) value greater than 1.5 indicates activity.

In this test, 13-ethyl-17α-ethynyl-17-hydroxygon-4-en-3-one, thiosemicarbazone, administered at 25 and 50 mg./kg. caused a T/C, respectively, of 2.01 and 2.42, and was active; and l-13-ethyl-17α-ethylnyl-17-hydroxygon-4-en-3-one, thiosemicarbazone, administered at 25 and 50 mg./kg. caused a T/C, respectively, of 1.61 and 2.52, and was active. It is noteworthy that the last named compound is devoid of progestational activity in the Clauberg test [Procedure, Elton and Edgren, Endocrinology, 63, 464 (1958)].

We claim:

1. A compound of the formula

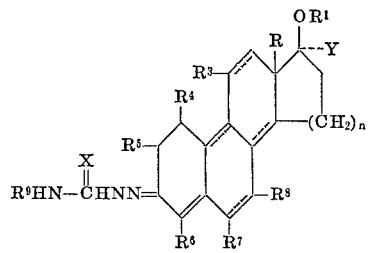

wherein X is O or S;

Y is alkyl or —C≡C—R² wherein R² is hydrogen, methyl, chloro, bromo or fluoro;

R is alkyl;

R¹ is hydrogen or alkanoyl;

R³, R⁴, R⁵, R⁶, R⁷ and R⁸ are hydrogen or methyl;

R⁹ is hydrogen, alkyl, monocarbocyclic aryl, monocarbocyclic arylalkyl or alkylmonocarbocyclic aryl;

n is 1 or 2; the broken lines indicate a single or double bond and said alkyl and alkanoyl substituents contain from about 1 to about 7 carbon atoms.

2. A gon-4-ene compound as defined in claim 1 wherein X is S; Y is —C≡CH, R is ethyl, R¹, R³, R⁴, R⁵, R⁶, R⁷, R⁸ and R⁹ are hydrogen and n is 1.

3. A compound as defined in claim 2 in the form of its l-enantiomer, substantially free of its d-enantiomer.

4. A gon-4-ene compound as defined in claim 1 wherein X is S; Y is —C≡CH, R is methyl, $R^1$, $R^3$, $R^4$, $R^5$, $R^6$, $R^7$, $R^8$ and $R^9$ are hydrogen and $n$ is 1.

5. A gon-4-ene compound as defined in claim 1 wherein X is S; Y is —C≡CCl, R is ethyl, $R^1$, $R^3$, $R^4$, $R^5$, $R^6$, $R^7$, $R^8$ and $R^9$ are hydrogen and $n$ is 1.

6. A gon-4-ene compound as defined in claim 1 wherein X is S; Y is —C≡CCl, R and $R^9$ are ethyl, $R^1$, $R^3$, $R^4$, $R^5$, $R^6$, $R^7$ and $R^8$ are hydrogen and $n$ is 1.

7. A gon-4-ene compound as defined in claim 1 wherein X is S; Y is —C≡CH, R and $R^9$ are ethyl, $R^1$, $R^3$, $R^4$, $R^5$, $R^6$, $R^7$ and $R^8$ are hydrogen and $n$ is 1.

8. A gon-4-ene compound as defined in claim 1 wherein X is S; Y and R are ethyl, $R^1$, $R^3$, $R^4$, $R^5$, $R^6$, $R^7$, $R^8$ and $R^9$ are hydrogen and $n$ is 1.

9. A gon-4-ene compound as defined in claim 1 wherein X is O, Y is —C≡CH, R is methyl, $R^1$, $R^3$, $R^4$, $R^5$, $R^6$, $R^7$, $R^8$ and $R^9$ are hydrogen and $n$ is 1.

10. A gon-4-ene compound as defined in claim 1 wherein X is S; Y is —C≡CH; R is methyl; $R^1$, $R^3$, $R^4$, $R^5$, $R^6$, $R^7$ and $R^8$ are hydrogen; $R^9$ is ethyl and $n$ is 1.

11. A gon-4-ene compound as defined in claim 1 wherein X is S; Y is —C≡CH; R is methyl; $R^1$, $R^3$, $R^4$, $R^5$, $R^6$, $R^7$ and $R^8$ are hydrogen; $R^9$ is methyl and $n$ is 1.

References Cited

FOREIGN PATENTS

| | | | |
|---|---|---|---|
| 651,797 | 2/1965 | Belgium | 260—397.4 |
| 1,041,279 | 9/1966 | Great Britain | 260—397.4 |
| 1,043,018 | 9/1966 | Great Britain | 260—397.4 |

OTHER REFERENCES

Djerassi, "Steroid Reactions" (1963), pp. 62–63 relied on.

ELBERT L. ROBERTS, Primary Examiner

U.S. Cl. X.R.

260—397.45, 397.4